Patented Mar. 14, 1939

2,150,301

UNITED STATES PATENT OFFICE 2,150,301

TRANSPARENT NETTING

John S. Tinsley, New Brunswick, N. J., assignor to Hercules Powder Company, Wilmington, Del., a corporation of Delaware No Drawing. Application September 15, 1934, Serial No. 744,195

4 Claims. (Cl. 91—68)

This invention relates to an improvement in transparent netting, such, for example, as is known to the trade as "Cel-O-Glass".

Heretofore it has been known to produce transparent netting by the application to a gauze or netting, so as to coat the strands and fill the interstices, of a cellulose ester, as nitrocotton, a cellulose ether, or urea-formaldehyde (French Patent No. 659,942). Again, cellulose acetate has been variously used and it has been stated (Ohl, Kunst. 22, 28, 1932) that cellulose acetate only is of value.

The transparent nettings heretofore produced and used to replace glass in greenhouses, solaria, chicken houses, etc., have been found to be unsatisfactory for various reasons, among which are that they are not effectively water and weather resistant.

Now in accordance with this invention, it has been found that a transparent netting possessed of desired qualities with respect to flexibility and ultra-violet light transmission and of high resistance to water and weathering is produced by the application of a mixed fatty acid ester of cellulose to gauze or netting. More particularly, the mixed fatty acid ester of cellulose will be plasticized, and where desired other ingredients as, for example, a resin, may be included with the mixed ester.

In accordance with this invention mixed fatty acid esters of cellulose generally, as, for example, cellulose aceto-butyrate, cellulose aceto-propionate, cellulose aceto-valerate, etc., may be used. Any of the usual plasticizers and resins of known ultraviolet transmission may be used. Thus, triphenyl phosphate, dibutyl phthalate, tricresyl phosphate, etc., or mixtures thereof, may be used as plasticizers; while as a resin, if desired, non-drying oil modified alkyd resins, castor oil modified polyesters of sebacic acid, phthalic anhydride-glycerol resins, or mixtures thereof, may be used.

For application of the mixed ester to a gauze or netting a solvent or solvent composition of any well known type or formula well known to the art may be used. Thus, for example, ethylene dichloride, acetone, methyl ethyl ketone, etc., or mixtures thereof, may be used, and any well known diluents, as, for example, denatured alcohol, toluol, petroleum naphtha, etc., or mixtures thereof, may be included in the solvent composition.

The gauze or netting, which will desirably be of relatively fine mesh, may be of any desired material, as cotton, metal wire, or the like, as, for example, mosquito netting.

The mixed fatty acid ester of cellulose or composition including a plasticizer and, when desired, a resin, or other ingredient, in solution, may be applied to the gauze or netting in any suitable manner adapted to coat the threads or wires and fill the interstices of the gauze or netting. For example, application may be conveniently made by means of a coating roll, the coated gauze or netting being dried, i. e. the solvent eliminated, in the open air or in a solvent recovery system.

As more specifically illustrative, for example, a solution of cellulose aceto-butyrate is made up on the following formula:

| | |
|---|---|
| Cellulose acetobutyrate (high visc.) | 20 |
| Triphenyl phosphate | 2 |
| Dibutyl phthalate | 2 |
| Ethylene dichloride | 71 |
| Denatured alcohol | 5 |

The solution is applied to mosquito netting or other gauze or netting by means of a coating roll and dried in the air or in a solvent recovery system. On drying out of the solvent, a film of cellulose aceto-butyrate plasticized with triphenyl phosphate and dibutyl phthalate will be deposited on the netting coating the strands thereof and filling the interstices.

As further illustrative of this invention, for example, following the procedure indicated above, cellulose acetate-butyrate solutions made up on the following formulae may be used:

| | A | B | C |
|---|---|---|---|
| Cellulose acetobutyrate | 20 | 20 | 20 |
| Tributyl phosphate | 5 | | |
| Butyl tartrate | | 3 | |
| Dibutyl phthalate | | | 2 |
| Glycerol-phthalate resin modified with non-drying oil—65% to 35% (Rezyl 33) | | | 2 |
| Ethylene dichloride | 70 | 72 | 71 |
| Denatured alcohol | 5 | 5 | 5 |

The advantages of the transparent netting according to this invention, on the first formula given above, will be indicated by the following table of comparison with transparent netting produced with the use of cellulose acetate, similarly formulated, thought by the prior art to be the only material of value for the production of transparent netting:

| | Cellulose acetobutyrate | Cellulose acetate |
|---|---|---|
| Min. wave length light transmitted: | | |
| 0.01 cm. thick | 2850 | 2780 |
| 0.04 cm. thick | 2910 | 2850 |
| Flexibility (Schopper double folds) | | |
| 0.04 cm. thick | 20–30 | 20–34 |
| H₂O absorption (24 hours) | 1.0–1.1% | 1.5–1.8% |
| Appearance after exposure to weatherometer for 2 months | Flexible, glossy | Dull, brittle. |

From the above table it will be apparent that the transparent netting according to this invention is possessed of markedly better resistance to water absorption than that produced with acetate and that from the standpoint of weather resistance the product in accordance with this invention is efficient as compared with failure of the acetate product. At the same time it will be noted that the netting according to this invention possesses practically the same capacity for light transmission and practically the same flexibility as the acetate product.

What I claim and desire to protect by Letters Patent is:

1. A transparent netting comprising a netting coated with a film including a mixed fatty acid ester of cellulose selected from the group consisting of cellulose acetopropionate, cellulose acetobutyrate and cellulose acetovalerate; a plasticizer selected from the group consisting of triphenyl phosphate, dibutyl phthalate and tricresyl phosphate; and a resin selected from the group consisting of non-drying oil modified alkyd resins, castor oil modified polyesters of sebacic acid and phthalic anhydride-glycerol resins.

2. A transparent netting comprising a netting coated with a film including cellulose acetopropionate, a plasticizer selected from the group consisting of triphenyl phosphate, dibutyl phthalate and tricresyl phosphate, and a resin selected from the group consisting of non-drying oil modified alkyd resins, castor oil modified polyesters of sebacic acid and phthalic anhydride-gylcerol resins.

3. A transparent netting comprising a netting coated with a film including cellulose acetobutyrate, a plasticizer selected from the group consisting of triphenyl phosphate, dibutyl phthalate and tricresyl phosphate, and a resin selected from the group consisting of non-drying oil modified alkyd resins, castor oil modified polyesters of sebacic acid and phthalic anhydride-glycerol resins.

4. A transparent netting comprising a netting coated with a film including cellulose acetovalerate, a plasticizer selected from the group consisting of triphenyl phosphate, dibutyl phthalate and tricresyl phosphate, and a resin selected from the group consisting of non-drying oil modified alkyd resins, castor oil modified polyesters of sebacic acid and phthalic anhydride-glycerol resins.

JOHN S. TINSLEY.